May 1, 1951     J. MORKOSKI     2,551,451
IMPLEMENT HITCH
Filed Dec. 29, 1945
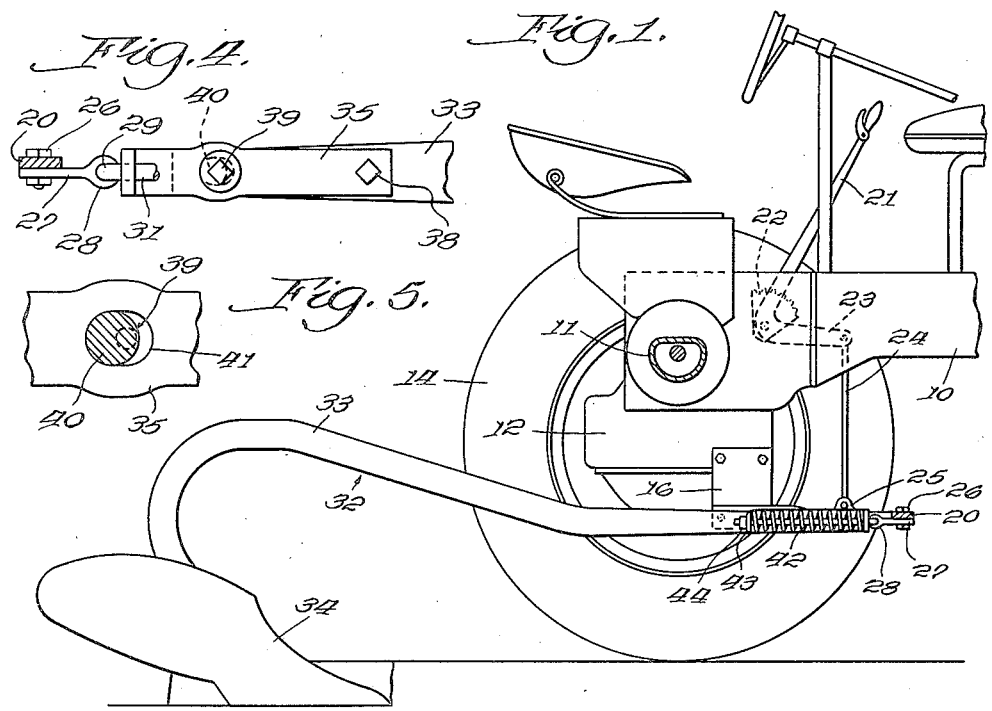
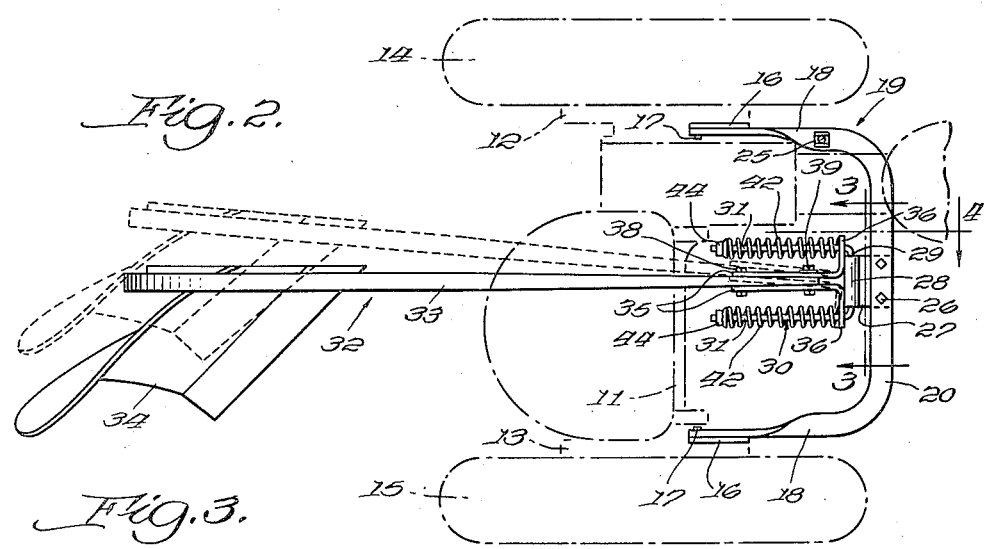
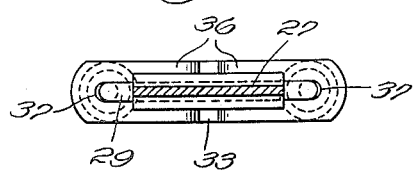
Inventor:
James Morkoski.
By Paul O. Pippel
Atty.

Patented May 1, 1951

2,551,451

UNITED STATES PATENT OFFICE 2,551,451

IMPLEMENT HITCH

James Morkoski, Canton, Ill., assignor to International Harvester Company, a corporation of New Jersey Application December 29, 1945, Serial No. 638,111

4 Claims. (Cl. 97—47)

This invention relates to an agricultural implement.

An object of the invention is to provide in a tractor attached implement, such as a plow, a simplified hitch structure for connecting the plow to the tractor.

Another object of the invention is to provide a hitch structure for connecting an implement to a tractor offering resilient relative longitudinal and lateral movement between the implement and the tractor.

A further object of the invention is to provide in a tractor attached plow or the like, an improved hitch structure including means for stabilizing the plow by the tractor, accommodating relative movement between the plow and the tractor, and including means for relatively moving the beam and the hitch for leveling the plow.

Other objects and advantages of the invention will become clear from the following description when read in conjunction with the accompanying drawings wherein:

Fig. 1 is a view in side elevation of the rear end of a tractor with one rear wheel removed showing connected thereto an implement and hitch structure embodying the features of the present invention.

Fig. 2 is a plan view of the structure shown in Fig. 1 and indicating in dotted lines the extent of lateral swinging of the plow.

Fig. 3 is a section taken on the line 3—3 of Fig. 2.

Fig. 4 is a section taken on the line 4 in Fig. 2.

Fig. 5 is a detail partly in section of the bolt structure shown in Fig. 4.

Referring to the drawings, it will be noted that the numeral 10 designates the longitudinally extending body of a tractor of the offset-type having a transverse rear axle structure 11, depending stub axle housings 12 and 13, and rear drive wheels 14 and 15.

Secured to the stub axle housings 12 and 13 and depending therefrom are brackets 16 to which are pivotally attached at 17 rearwardly extending arms 18 of a U-shaped draw-bar generally indicated at 19 and having a transverse portion 20. Draw-bar 19 is thus capable of swinging vertically about the pivot 17 but is retained against such movement by an adjusting mechanism comprising a lever 21 pivotally mounted upon a quadrant 22 secured to the body of the tractor. Lever 21 has an arm 23 which is connected by a link 24 to a lug 25 secured to the draw-bar 19. A suitable detent mechanism for the lever 21 may be provided whereby the lever 21 is retained in a number of adjusted positions over the quadrant 22 and the draw-bar 19 is likewise retained in its adjusted position.

Secured to the transverse portion 20 of the draw-bar 19 by bolts 26 is a relatively wide link 27 terminating rearwardly in a transverse bearing portion 28. Bearing 28 accommodates for pivotal movement therein the transverse portion 29 of a U-shaped member 30 having rearwardly extending laterally spaced arms 31.

This U-shaped member 30 serves for the stabilization and connection to the tractor of an implement 32 comprising a longitudinally extending tool-beam 33 curved downwardly at its rear end for the attachment thereto of a plow bottom 34. The forward end of the tool beam 32 has secured to opposite sides thereof hitch bars 35, the forward ends of which project somewhat beyond the end of the beam 33 and are turned laterally to form ears 36. Ears 36 are provided with apertures 37 for the reception of the arms 31 of the U-shaped member 30. The tool-beam 33 with the hitch bars 35 is thus longitudinally slidable with respect to the member 30 and the openings 37 are sufficiently oversized to accommodate lateral movement of the beam with respect to the member 30.

Attachment of the hitch bars 35 to the sides of the tool-beam 33 is made by means of bolts 38 and 39. In order to provide for adjustment of the plow bottom 34 about a longitudinal axis for leveling the same, the bolt 39 is provided with an eccentric neck portion 40 which is received in an enlarged slot 41 in the left-hand hitch bar 35. Upon rotation of the bolt 39, the eccentric portion 40 thereof forces the forward end of the left-hand hitch bar 35 upwardly or downwardly to laterally tilt the tool-beam 33 to one side or the other.

In order to provide for resilient relative longitudinal and lateral movement between the tool-beam 33 and the member 30, the arms 31 are surrounded by springs 42. The springs abut at one end against the ears 36 and at the other ends against collars 43 held in place by nuts 44 received upon threaded ends of the arms 31.

Upon encountering obstacles in its path during travel thereof over a field, the plow bottom 34 is protected against damage by the yielding movement permitted by the springs 42. Lateral movement of the tool-beam 33 is likewise permitted, as indicated in dotted lines in Figure 2, to permit the plow bottom to avoid obstacles and to follow the contour of the ground. It should likewise be clear that the tool-beam 33 carrying the plow bottom 34 is capable of vertical pivotal movement about the connection of the member 30 to the link 27. Adjustment of the operating depth of the plow may be made by raising or lowering the front end of the plow beam to change the pitch of the plow bottom 34. This is accomplished by raising and lowering the drawbar 19 to which the plow is attached through the medium of adjusting the position of the hand lever 21 over the toothed segment or quadrant 22.

The operation of the apparatus of the present invention should be clear from the foregoing description. While the invention has been described in its preferred embodiment, it should be understood that various modifications may be made therein without departing from the spirit of the invention or the scope of the appended claims.

What is claimed is:

1. In combination, a traveling support, a longitudinally extending plow beam, means connecting the beam at its forward end to the support comprising a transverse bearing on the support, a U-shaped member having its bight portion pivotally received in the bearing, laterally spaced ears at the forward end of the beam apertured to receive the arms of said member for longitudinal sliding movement thereon, a compression spring on each arm abutting said ears to flexibly resist longitudinal movement of the beam with respect to the support, the apertures in said ears being sufficiently large to accommodate lateral swinging of the beam against the action of said springs and the engagement of said arms with said ears serving to stabilize the latter against lateral tilting about a longitudinal axis.

2. In combination, a traveling support, a longitudinally extending plow beam, means connecting the beam at its forward end to the support comprising a transverse bearing on the support, a U-shaped member having its bight portion pivotally received in the bearing, laterally spaced ears at the forward end of the beam apertured to receive the arms of said member for longitudinal sliding movement thereon, the engagement of said arms with said ears serving to stabilize the latter against lateral tilting about a longitudinal axis, the said apertures being sufficiently large to accommodate lateral swinging of the beam to opposite sides of a normal neutral position, and a compression spring on each arm arranged to flexibly resist both longitudinal and lateral movement of the beam.

3. The combination with a tractor of a drawbar mounted thereon, a plow having a longitudinally extending supporting beam, means connecting the forward ends of the beam to said draw-bar for vertical pivotal movement comprising a transversely extending bearing secured to the draw-bar, a member having rearwardly extending arms and a transverse portion pivotally received in said bearing, lateral extensions on the forward ends of said beam apertured to slidably receive said arms for relative longitudinal movement and to permit pivoting of said beam with said member, said apertures being sufficiently large to accommodate limited lateral swinging movement of the beam with respect to said member, and compression springs on said arms resiliently resisting lateral swinging of the beam.

4. The combination with a tractor of a drawbar mounted thereon, a plow having a longitudinally extending supporting beam, means connecting the forward end of the beam to said draw-bar for vertical pivotal movement comprising a transversely extending bearing secured to the draw-bar, a member having rearwardly extending arms and a transverse portion pivotally received in said bearing, laterally spaced hitch bars on opposite sides of said beam, said bars being bent outwardly to form ears apertured to slidably receive said arms, means for adjustably securing said bars to said beam including a pair of longitudinally spaced bolts, eccentric means associated with one of said bolts and engageable with one said hitch bar for vertically adjusting the latter relative to the beam, whereby to rotate said beam about a longitudinal axis to level the plow, and springs surrounding said arms and abutting said ears to resist relative movement of the beam and the member.

JAMES MORKOSKI.

REFERENCES CITED

The following references are of record in the file of this patent:

UNITED STATES PATENTS

| Number | Name | Date |
|---|---|---|
| Re. 19,762 | Johnson | Nov. 19, 1935 |
| 922,905 | Huggins | May 25, 1909 |
| 1,085,190 | Bennett | Jan. 27, 1914 |
| 1,173,479 | Buckman | Feb. 29, 1916 |
| 1,946,685 | Graham | Feb. 13, 1934 |
| 2,340,165 | Young | Jan. 25, 1944 |
| 2,362,712 | Morkoski | Nov. 14, 1944 |

FOREIGN PATENTS

| Number | Country | Date |
|---|---|---|
| 157,852 | Switzerland | Dec. 16, 1932 |